United States Patent Office 3,450,034
Patented June 17, 1969

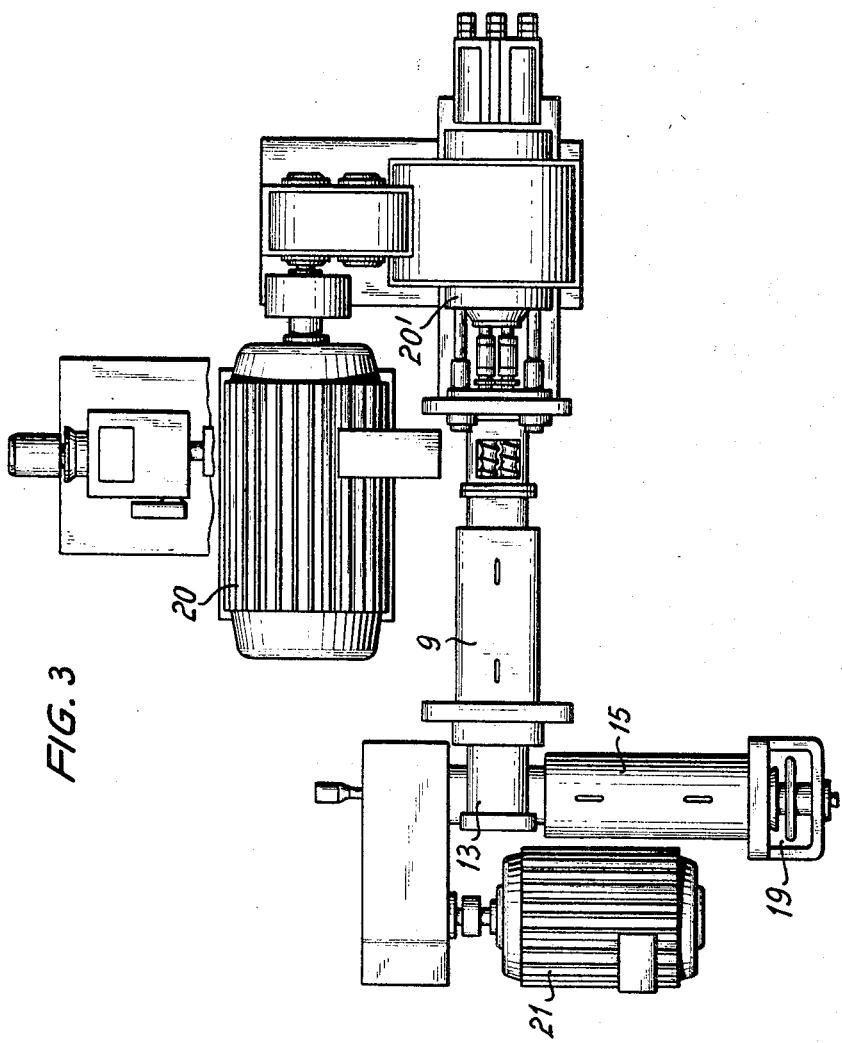

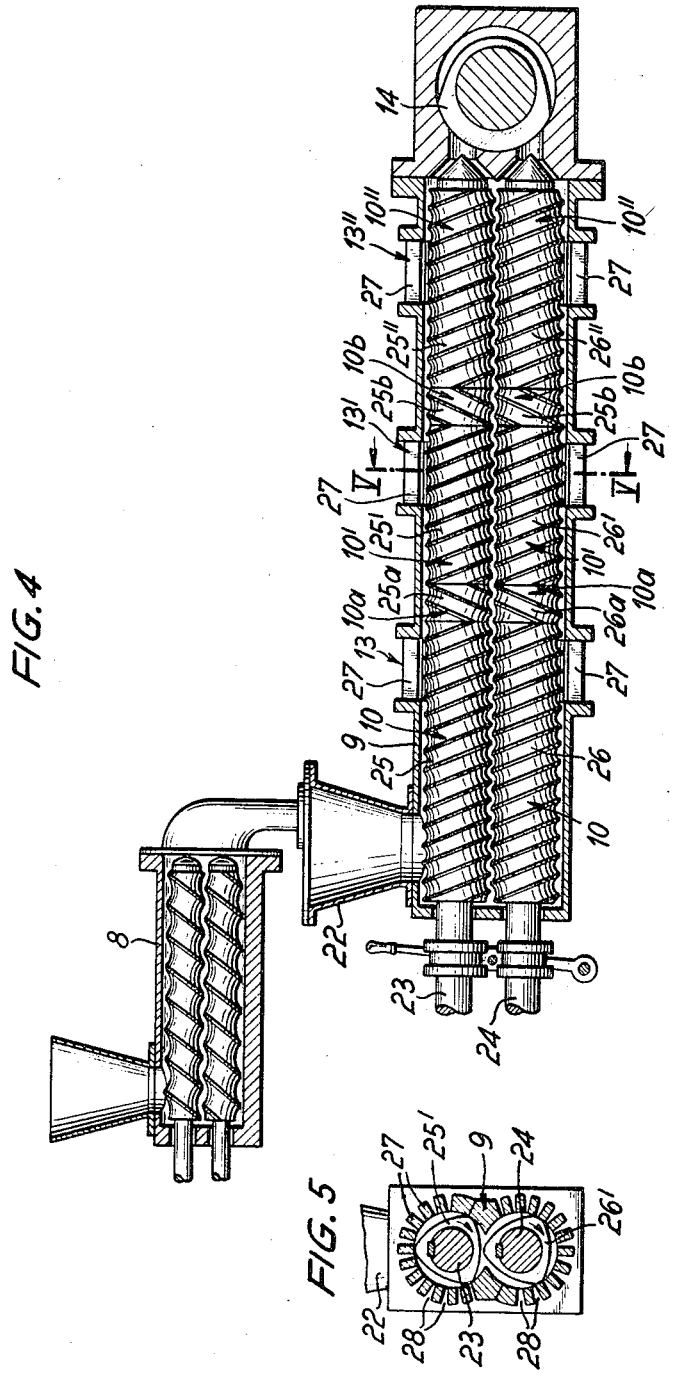

3,450,034
INSTALLATION FOR EXTRACTING LIQUID FROM VEGETABLE MATTER
Herbert W. G. Ocker, Baden-Wurttemberg, Germany, assignor to Werner & Pfleiderer, Stuttgart-Feuerbach, Germany, a German company
Filed Apr. 22, 1966, Ser. No. 544,558
Claims priority, application Germany, Apr. 23, 1965, W 39,037
Int. Cl. B30b 9/12, 9/14, 9/16
U.S. Cl. 100—117      6 Claims

ABSTRACT OF THE DISCLOSURE

An installation for extracting liquid from vegetable matter, including a double wormed conveying, milling and obstructing device which has alternating sections of opposite screw thread pitch. The liquid so released from the vegetable matter flows in one direction to a separating stage while the milled matter flows in the opposite direction to repeat the process for further extraction.

---

The principal object of the present invention is the provision of installation for extracting liquid from liquid bearing material which will tend to maximize the yield of liquid from the liquid bearing material and to do so at a reduced cost.

Another object is the reduction of costs in equipment, maintenance and supervision.

Another object is the provision of an extraction installation including means producing a flow of liquid bearing material, means for metering and precrushing the flow of liquid bearing material, means for milling, conveying and obstructing adapted to receive at a first end the flow of material from said means for metering and precrushing, said means for milling, conveying and obstructing including a pair of parallel shafts mounted in a single tubular housing, each said shaft having a first plurality of spaced apart screw thread sections for milling and conveying and a second plurality of spaced apart screw thread sections for obstructing, said second plurality having a pitch opposite that of said first plurality of sections and interposed between said first plurality of sections, and a plurality of separating stages mounted in said housing through which the removal liquid passes, each of said stages spaced between the first end and one of said second plurality of sections, said housing having an opening at the other end through which passes the pressed material to a single worm press for further extracting the liquid from the pressed material.

A further object of the invention is the provision of an improved means for milling, conveying and obstructing, comprising a pair of parallel shafts mounted in a single tubular housing, each said shaft having a first plurality of spaced apart screw thread sections for milling and conveying, and a second plurality of spaced apart screw thread sections for obstructing, said second plurality having a pitch opposite that of said first plurality of sections and interposed between said first plurality of sections and a plurality of separating stages mounted in said housing through which the removal liquid passes, each of said stages spaced between the first end and one of said second plurality of sections, said housing having an opening at the other end through which passes the pressed material for further processing.

A further object is the provision of a heater in combination with the means for milling, conveying and obstructing for increasing the yield of oil.

A final object is the provision of a decreased mutual internal pitch depth over the region in which the screw sections intersect in the direction towards the opening.

The invention will now be described with reference to the accompanying drawings, which are not intended to be restrictive.

FIG. 3 is a plane view of the installation shown in FIG. 2.

FIG. 4 is a simplified representation of the housing which accommodates the milling and conveying, separating and obstructing stages, on a larger scale.

FIG. 5 is a section along the line V—V in FIG. 4.

Figure 1:
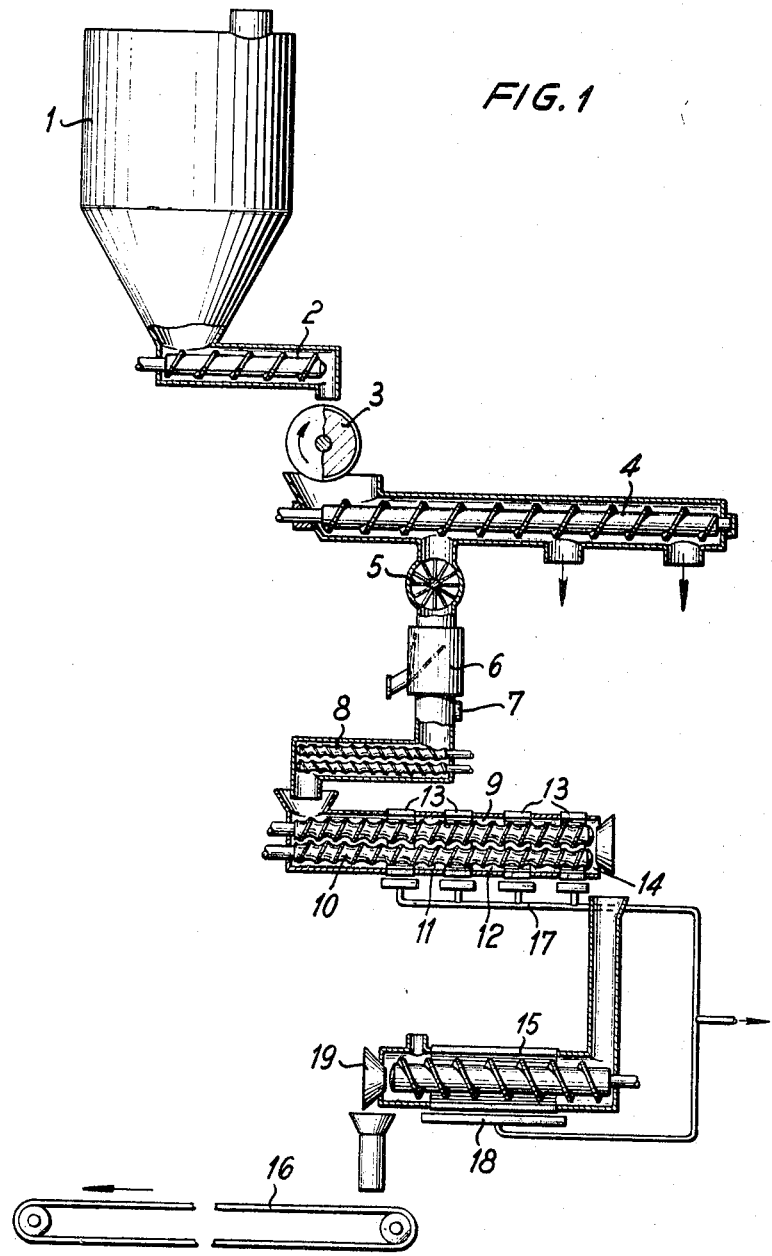
FIG. 1 shows a front elevation section of the installation.

From a central bunker 1, the raw material to be pressed, for example copra in shell form, palm kernels, ground nut kernels, linseed, or other oil containing seeds or fruits, is conveyed via a closed delivery worm 2 to a magnetic separator 3 and hence to a distributor worm 4, several pressing devices (only one of which is shown) can be connected to the worm 4 depending on the size of the installation. Each of the pressing devices is charged via a charging gate 5, to a separator 6 having an indicator 7 which shows to what extent it is filled and a metering worm 8 which measures out quantities, constructed for example as a double worm. Depending on the size of the material to be pressed out, the metering worm 8 pre-crushes the material to be pressed, conveys it, in said pre-crushed state, to a first milling and conveying stage 10 which is in the form of a double worm and accommodated inside housing 9. Associated with the first milling and conveying stage 10 is a separating stage 13, and an obstructing stage, which impedes the progress of material through housing 9 and the liquid is extracted and separated off in advance of the obstructing stage, as will be discussed below. Housing 9 incorporates the features of milling, conveying, obstructing and separating. Liquid so extracted from each stage will be conveyed away via collector pipes.

The pressed material which is discharged from the outlet side 14 of the housing 9 has had the oil extracted from it and can then either be subjected to further treatment, or conveyed to a one-stage press 15, if the pressed material will permit any further extraction of oil. The oil so obtained is collected in a suitable tank 18 and conveyed to the a storage tank. The pressed residue, from which the oil has now been completely extracted, is discharged at the end 19 of the one-stage press 15 and conveyed away via a conveyor belt 16 or the like. If desired, water may be sprayed in, inside the press 15, before the pressed material, so that the residue or discharged cakes have a suitable moisture content.

Figure 2:
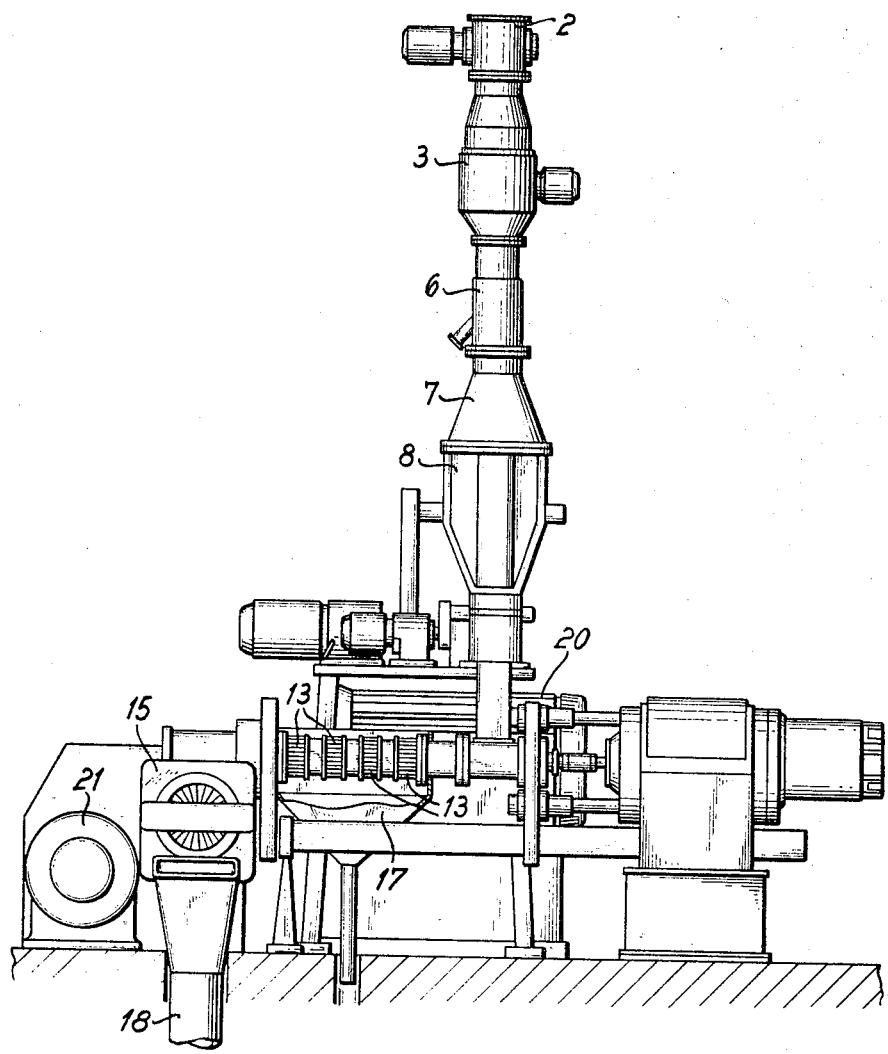
FIG. 2 is a front elevation of the installation shown in FIG. 1.

In FIG. 2 and 3 of the drawing, an arrangement of the separate parts of the installation is shown. The raw material from the central bunker (not shown in FIG. 2) is conveyed via the delivery worm 2, magnetic separator 3, the optional distributor worm 4, through the charging gate 5, to the metering worm 8 in which the material to be pressed is pre-crushed if desired. From the measuring-out worm 8, which is constructed as a double worm, the material to be pressed passes into the filling side of the housing 9, and to the first milling and conveying stage, which is shown in greater detail in FIG. 4 of the drawing. The separate separating stages 13 allow the oil to flow away to a plurality of places in the housing 9, the oil content of the pressed material now constantly decreasing towards the outlet-side 14 of the press, and, for example, already reaching its possible end amount. The worms of the separate milling and conveying stages and obstructing stages are driven from a common motor 20 via a corresponding set of gears 20'.

Connected to the housing 9, there is provided a single-worm final press 15, which is driven from a separate drive-motor 21. At the end 19 of the press 15, the pressed material, from which all the oil has been extracted, flows onto a conveyor belt (not shown in FIGS. 2 and 3 of the drawing), and is transported, for further treatment or to an installation which fills it into sacks.

Depending on the size, in a particular case, of the housing 9, and on the number of milling and conveying, separating and obstructing stages provided, the final press can be arranged co-axial to the housing 9, or as shown in FIG. 3, with its longitudinal axis arranged transversely in relation thereto. In the same manner, the position of the drive motors and of the gears connected thereto can be adapted to suit the particular space requirements without the advantages achieved by the invention being adversely influenced or diminished thereby. The pipes 17 and 18 which are necessary for the discharge of the extracted oil can be seen from FIG. 2 of the drawing, the arrangement of which can also be modified within the scope of the invention, in accordance with the positions of the separate pressing or separating stages.

The arrangement of the individual milling and conveying stages and separating and obstructing stages which is essential for working the process of the invention can be seen in particular from FIGS. 4 and 5 of the drawing. A housing 9 is provided, which has a filling hopper 22 and is connected with the metering device 8 which as already mentioned is constructed as a double worm unit and serves as a pre-crushing device. Inside the housing 9 are mounted two shafts 23 and 24, which extend the whole length of the housing and on which the worms 25, 26; 25′, 26′ and 25″, 26″ are carried. The pitch of the worms 25, 26; 25′, 26′ and 25″, 26″ can be the same, or can be different within the separate milling and conveying stages 10, 10′, 10″ formed by each of the aforesaid worm pairs—for example, they may be formed such that they decrease in size towards the outlet end 14 of the housing 9. Between the separate milling and conveying stages 10, 10′ and 10″, return conveying screwthreads 25a, 26a and 25b, 26b whose threads are of opposite hand of worms 25, 26; 25′, 26′; 25″, 26″ on the same respective shaft are provided on the shafts 23, 24, which return screw threads act as obstruction stages in front of which the pressed material becomes piled up and is subjected to increased pressure, with the result that the oil can separate flow away through the connected separating stages 13, 13′ and 13″. The separating stages 13, 13′ and 13″ are formed by single rods 27 inserted in the housing 9, a gap 28 being left remaining between every two rods, through which the oil can flow off. The width of this gap 28 and also its position can be adapted to suit different operating-conditions, for instance, by constructing the individual separating stages 13, 13′, 13″ the parts which are provided with the rods 27 are adapted to be inserted inside the housing 9, such determinations being made in accordance with the material which is to be pressed in a particular case, or in accordance with the operating conditions in a particular case. FIG. 5 of the drawings shows the position of the single rods and their arrangement inside the housing 9, and also the arrangement of the worms on the shafts 23 and 24 and their convolutions, which deviate from the circular form.

At the end of housing 9 is an outlet with an adjusting means for providing an adjustable outlet for the pressed material. Other alternatives are possible within the scope of the invention with regard to the construction of the worms and of the obstructing stages connected to the separate milling and conveying stages. If desired, the installation can be arranged such that when fine grained material is to be pressed, not all of the milling and conveying stages are operated. Also, the charging of the housing 9 may, for example, take place only at the second milling and conveying stage 10′, i.e. the material to be pressed is conveyed directly to the second milling and conveying stage 10′. As can be seen from FIG. 4 of the drawing, such is formed within the scope of the invention, the separate stages and also the conveying and metering worms may be construed such that they operate as self-cleaning worms and thus do not require any special maintenance.

I claim.

1. In an extraction installation including means producing a flow of liquid bearing material, means for metering and precrushing the flow of liquid bearing material, means for milling, conveying and obstructing adapted to receive at a first end the flow of material from said means for metering and precrushing, said means for milling, conveying and obstructing comprising a pair of parallel shafts mounted in a single tubular housing, each said shaft having a first plurality of spaced apart screw thread sections for milling and conveying and a second plurality of spaced apart screw thread sections for obstructing, said second plurality having a pitch opposite that of said first plurality of sections and interposed between said first plurality of sections and a plurality of separating stages mounted in said housing through which the removed liquid passes, each of said stages spaced between the first end and one of said second plurality of sections, said housing having an opening at the other end through which it passes the pressed material for further processing.

2. An installation according to claim 1, wherein the opening includes a nozzle with an adjustable orifice.

3. An installation according to claim 2 wherein the mutual internal pitch depth over the region in which the screw sections intersect decreases in the direction towards the opening.

4. An installation according to claim 3, wherein a plurality of rods are spaced about the periphery of the housing and separating stages are formed by the spaces between the rods.

5. An extraction installation including means producing a flow of liquid bearing material, means for metering and precrushing the flow of liquid bearing material, means for milling, conveying and obstructing adapted to receive at a first end the flow of material from said means for metering and precrushing, said means for milling, conveying and obstructing including a pair of parallel shafts mounted in a single tubular housing, each said shaft having a first plurality of spaced apart screw thread sections for milling and conveying and a second plurality of spaced apart screw thread sections for obstructing, said second plurality having a pitch opposite that of said first plurality of sections and interposed between said first plurality of sections, and a plurality of separating stages mounted in said housing through which the removed liquid passes, each of said stages spaced between the first end and one of said second plurality of sections, said housing having an opening at the other end, and a single worm disposed adjacent the opening into which passes the pressed material for further extracting the liquid from the pressed material.

6. An installation according to claim 5 wherein the means for precrushing and metering comprises a pair of worm screws.

References Cited

UNITED STATES PATENTS

| 1,773,771 | 8/1930 | Anderson | 100—145 |
|---|---|---|---|
| 2,119,162 | 5/1938 | Hartner | 100—146 |
| 2,299,784 | 10/1942 | Anderson | 100—93 |
| 2,458,068 | 1/1949 | Fuller | 100—93 X |
| 2,567,219 | 9/1951 | Lesniak. | |
| 3,070,005 | 12/1962 | Kemp et al. | 100—146 |
| 3,146,493 | 9/1964 | Steinle et al. | |
| 3,189,324 | 6/1965 | Gubler | 259—9 |

FOREIGN PATENTS 835,621   5/1960   Great Britain.

BILLY J. WILHITE, *Primary Examiner.*

U.S. Cl. X.R.

100—127, 146, 148